United States Patent
Favagrossa

(10) Patent No.: US 7,003,842 B1
(45) Date of Patent: Feb. 28, 2006

(54) CAR WASHING BRUSH WITH MEANS FOR PRESSURE-LUBRICATING AND CLEANING THE BRUSH BRISTLES FOR THE INSIDE THEREOF

(76) Inventor: Francesco Favagrossa, Via Teatro, 12, 46018 Sabbioneta (Cremona) (IT)

( * ) Notice: Subject to any disclaimer, the term of this patent is extended or adjusted under 35 U.S.C. 154(b) by 107 days.

(21) Appl. No.: 10/220,725

(22) PCT Filed: Oct. 24, 2000

(86) PCT No.: PCT/IT00/00427

§ 371 (c)(1),
(2), (4) Date: Dec. 30, 2002

(87) PCT Pub. No.: WO01/65971

PCT Pub. Date: Sep. 13, 2001

(30) Foreign Application Priority Data

Mar. 8, 2000 (IT) ............ MI2000A0464

(51) Int. Cl.
*B60S 3/00* (2006.01)
(52) U.S. Cl. .................. 15/53.2; 15/21.1; 15/23; 15/34; 15/50.3; 15/53.1; 15/179
(58) Field of Classification Search ............... 15/53.2, 15/53.1, 21.1, 88.4, 179, 50.3, 183, 34, 23, 15/DIG. 2, 24, 29
See application file for complete search history.

(56) References Cited

U.S. PATENT DOCUMENTS

| 3,491,774 A | 1/1970 | Carbone |
| 4,204,494 A | 5/1980 | Bridwell et al. |
| 5,207,032 A | 5/1993 | Frymier et al. |
| 5,628,081 A | 5/1997 | Wanner et al. |

FOREIGN PATENT DOCUMENTS

| DE | 267 07 225 | 8/1998 |
| FR | 2 663 278 | 12/1991 |

*Primary Examiner*—John Kim
*Assistant Examiner*—Abraham Bahta
(74) *Attorney, Agent, or Firm*—Hedman & Costigan, P.C.

(57) ABSTRACT

The present invention relates to a car washing brush, provided with means for lubricating and cleaning the brush bristles, which comprises a tubular body (2), supporting variously distributed bristles (3) and which can be coupled to a motor-reducing assembly for turning the tubular body. The main feature of the invention is that the brush comprises moreover, associated with said tubular body, a plurality of channels (10) for conveying a fluid therethrough, said channels having a plurality of nozzles (11), for spraying a fluid on the brush bristles, from the inside toward the outside of the brush.

8 Claims, 4 Drawing Sheets

US 7,003,842 B1

CAR WASHING BRUSH WITH MEANS FOR PRESSURE-LUBRICATING AND CLEANING THE BRUSH BRISTLES FOR THE INSIDE THEREOF

BACKGROUND OF THE INVENTION

The present invention relates to a car washing brush, including means for pressure-lubricating and cleaning the brush bristles from the inside thereof.

As is known, conventional automatic car washing systems comprise washing brushes which are usually made of a supporting body or core, to which a plurality of bristles variously distributed and formed are coupled.

In the above brush arrangement, it is frequently necessary to replace and clean, after a given time period, the brush bristles since said bristles are insufficiently lubricated and dirt and waste materials accumulate thereon.

It is also known that conventional car washing systems usually comprise several nozzle arrangements for lubricating the brushes from their outside and which moreover spray cleaning water on the car being washed; however, because of a comparatively high stiffness of the mentioned nozzle arrangements, some regions of the car are not affected by the washing liquid, which, moreover, causes a great consume of the washing liquid, usually comprising a water-chemical compound mixture.

At present, the car washing brushes are rotatively driven in such a condition that the lubrication thereof is only partial, since it is performed from the outside of the brushes and is negatively affected by the centrifugal force.

The device according to the invention, on the other hand, provides the great advantage that it allows the user to use a perfectly and constantly lubricated brush, which is lubricated under pressure, through a 360° extension from the inside thereof, thereby assuring a contact of the brush bristles with the car body in a constant presence of lubricating products.

This result can be obtained since the subject device allows to lubricate under pressure from its inside, through an overall extension of 360°, the body of the cleaning brush.

This feature allows to continuously and constantly lubricate, by a water-chemical compound liquid mixture, the cleaning brush body, thereby allowing to greatly reduce the friction between the brush bristles and the surface of the car body to be washed.

SUMMARY OF THE INVENTION

Thus, the aim of the present invention is to overcome the above mentioned disclosed problems, by providing a car washing brush comprising means for cleaning the brush bristles, allowing to perform a perfect lubricating and cleaning of the brush bristles, in a fully automatic manner, without interrupting the operation of the brush, thereby providing a delicate and efficient cleaning of the washing brush during-the-washing operation thereof.

Within the scope of the above mentioned aim, a main object of the present invention is to provide such a car washing brush including means for lubricating and cleaning the bristles thereof, which can be used in conventional manners, while having greatly improved characteristics.

Yet another object of the present invention is to provide such a washing brush which, owing to its peculiar constructional features, is very reliable and safe in operation.

Yet another object of the present invention is to provide such a car washing brush which can be easily made starting from easily available elements and materials and which, moreover, is very competitive from a mere economic standpoint.

According to one aspect of the present invention, the above mentioned aim and objects, as well as yet other objects, which will become more apparent hereinafter, are achieved by a car washing brush including means for lubricating and cleaning the bristles thereof, comprising a tubular body supporting a plurality of variously distributed brush bristles and which can be coupled to a motor-reducing unit for rotatively driving said tubular body, characterized in that said brush comprises, associated with said tubular body, a plurality of channels for conveying a fluid therethrough, said channels including a corresponding plurality of nozzles for spraying a fluid on said bristles, from the inside toward the outside of the brush.

BRIEF DESCRIPTION OF THE DRAWINGS

Further characteristics and advantages of the present invention will become more apparent from the following detailed disclosure of a preferred, though not exclusive, embodiment of a car washing brush, including means for cleaning the bristles thereof, and which is illustrated, by way of an indicative, but not limitative, example, in the accompanying drawings, where.

DESCRIPTION OF THE PREFERRED EMBODIMENTS

Figure 1:
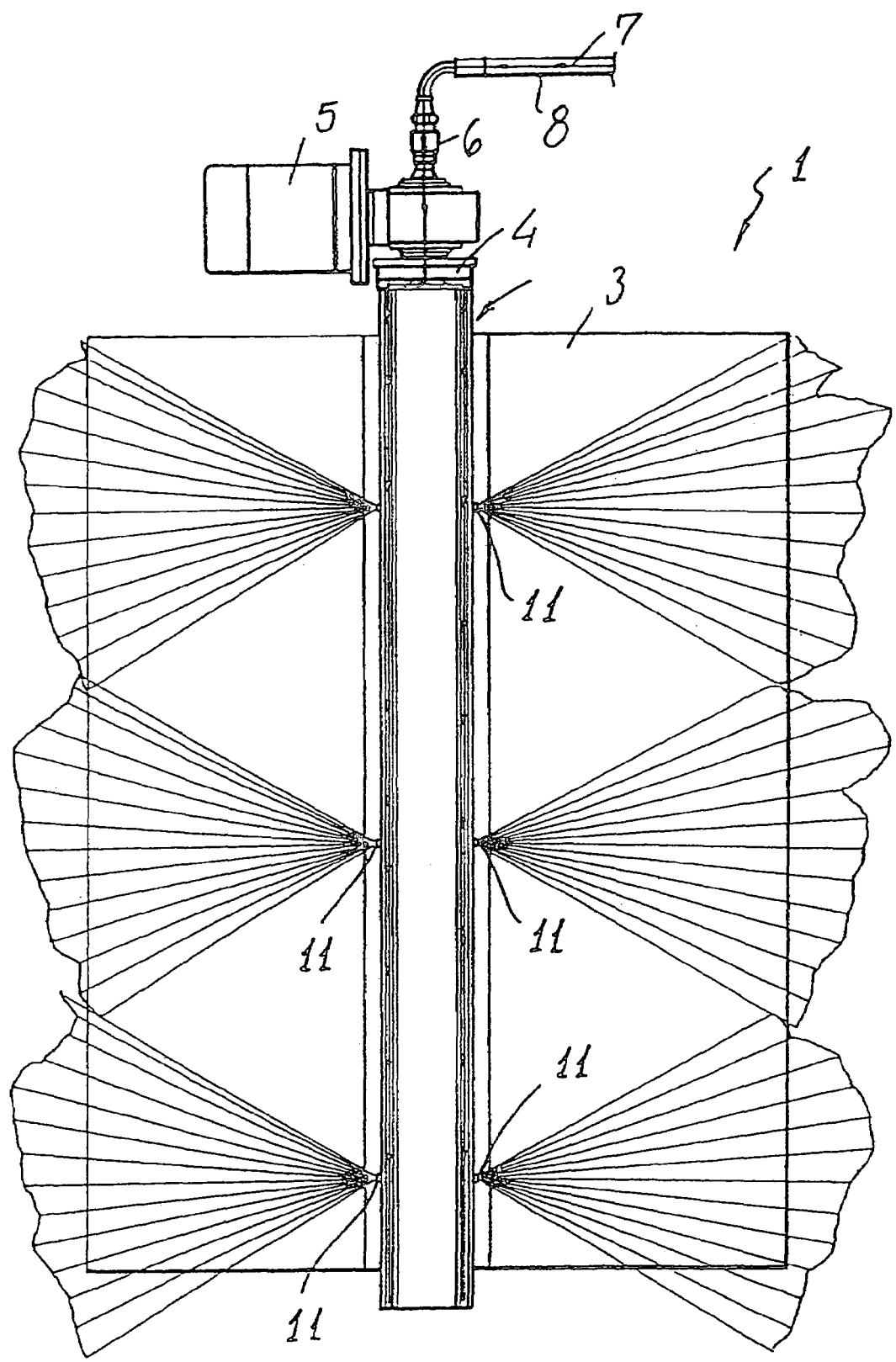
FIG. 1 is a schematic view illustrating the car washing brush according to the invention.
Figure 2:
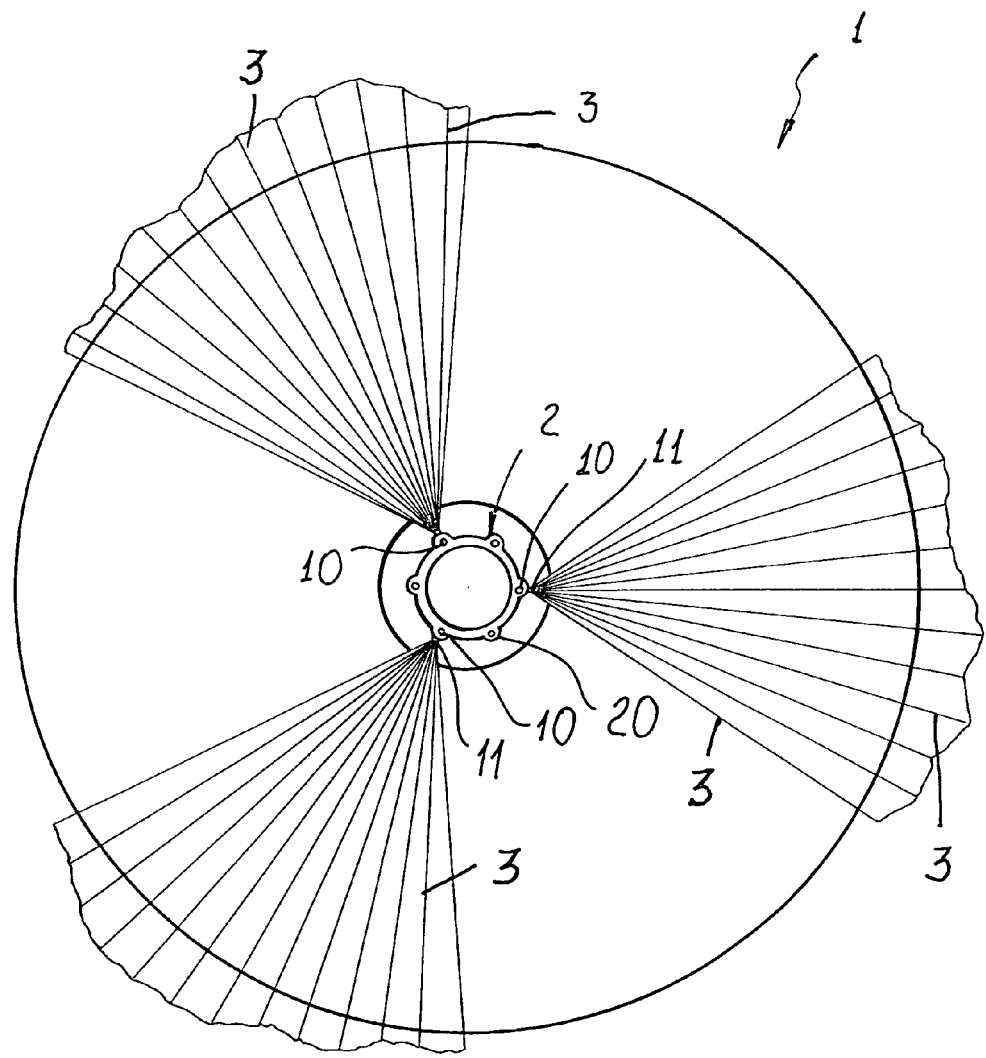
FIG. 2 is a further schematic cross-sectional view illustrating the brush, as well as the fluid sprayed therethrough.

With reference to the number references of the above mentioned figures, the car washing brush, including means for cleaning the bristles thereof, which has been generally indicated by the reference number 1, comprises a tubular element, generally indicated by the reference number 2, therefrom extend, in a per se known manner, a plurality of brush bristles, generally indicated by the reference number 3, which are variously distributed through the brush tubular body.

The tubular element or body 2 can be coupled, by a flange 4, to a motor-reducing unit 5, provided for rotatively driving the brush 1.

Moreover, a rotary coupling 6 is provided for coupling the brush assembly to an inner pipe 7 for conveying water or the like therethrough, as well as to a corresponding outer pipe 8 for conveying therethrough a foaming material or lubricating and/or cleaning liquid.

The main feature of the invention is that to the tubular body 2 a plurality of conveying channels 10 are coupled for conveying therethrough a fluid.

Figure 3:
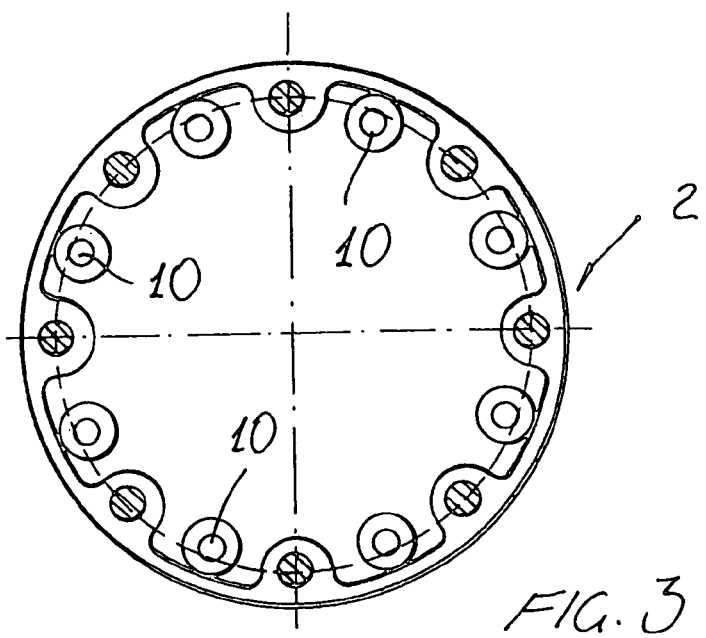
FIG. 3 is a further cross-sectional view illustrating the tubular body of the brush and the fluid conveying channels as well as seats for coupling corresponding flanges.
Figure 4:
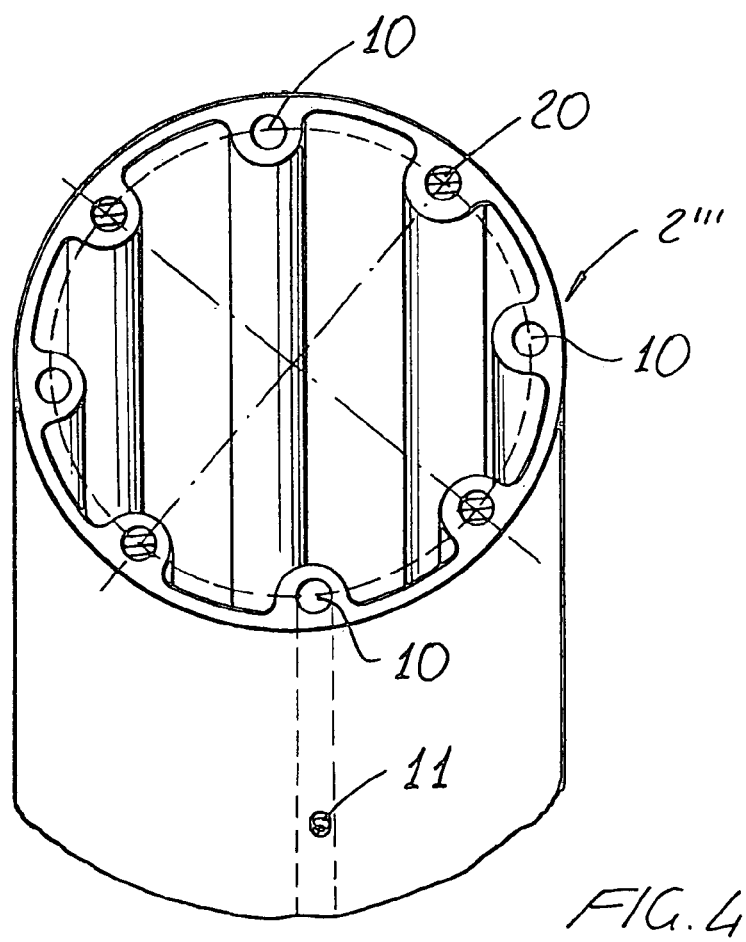
FIG. 4 is a further schematic cross-sectional view illustrating, perspectively, a tubular body.

More specifically, the channels 10 can be made, as is schematically shown in FIG. 3, of a separated tubular element, which is coupled to the tubular body or, possibly, as shown in FIGS. 4 to 7, said channels 10 can be directly integrated in the extruded material forming the tubular body.

In this connection it should be apparent that the channels 10 can be provided both on the inner surface and on the outer surface of the tubular body.

To the channels 10 a plurality of nozzles 11 are coupled, for spraying therethrough the fluid conveyed through the channels 10 on the brush bristles 3, from the inside to the outside of the brush, thereby continuously pressure-lubricating the bristles from the inside thereof, i.e. by spraying them with a liquid constantly holding said bristles in an efficient cleaned condition.

The fluid conveyed through the conveying channels can comprise water, a chemical liquid or air or any other suitable fluid.

In this connection it should be pointed out that the tubular body can be advantageously made by extruding, so as to define, together with the fluid conveying channels, a plurality of seats or recesses 20 for fixing therein a flange or the motor reducing unit.

Figure 5:
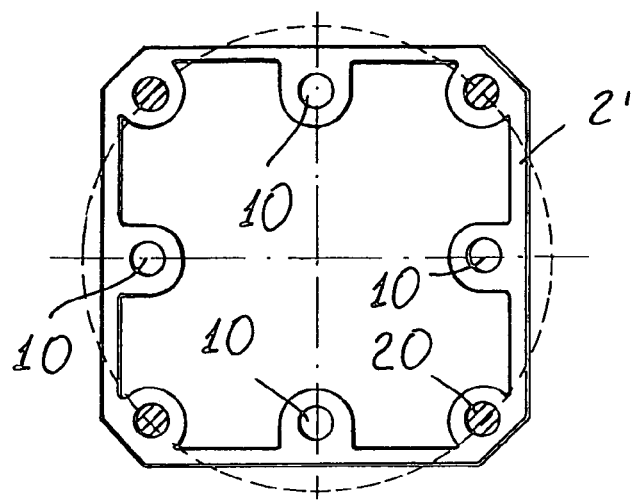
FIGS. 5, 6 and 7 are sectional views showing different configurations of the tubular body.

As is shown in FIG. 5, it would be further possible to provide a tubular body, generally indicated by the reference number 2', having a squared configuration and inside of which are alternately arranged the conveying channels 10 and flange fixing recesses or seats 20.

Figure 6:
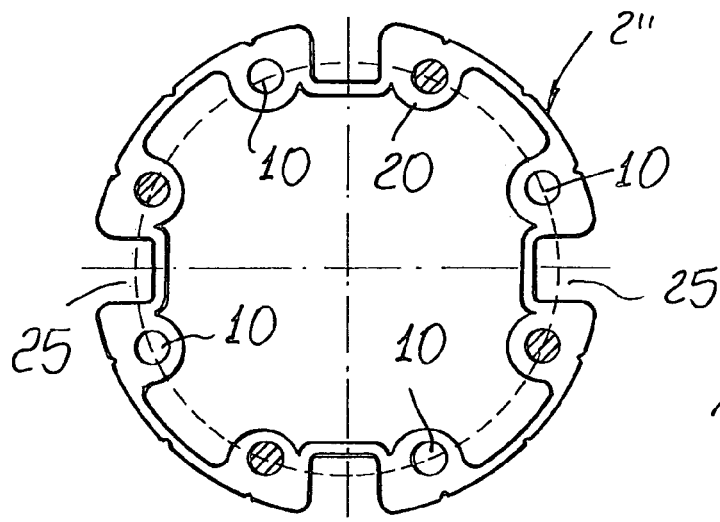

Likewise, as is shown in FIG. 6, it would be possible to provide a tubular body 2'", including a plurality of recessed regions 25 on the outer surface thereof and defining, in its inside, as a single piece with the extruded material, both the channels 10 and the seats 20 alternately circumferentially arranged.

Figure 7:
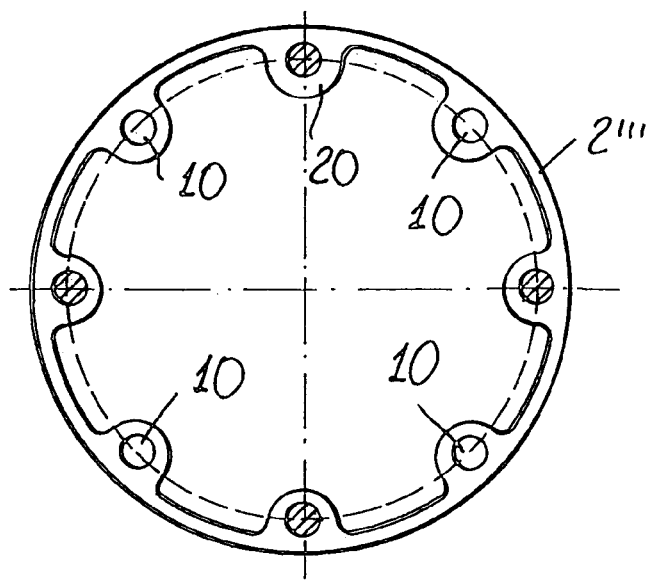

FIG. 7 illustrates a tubular body, indicated generally by 2'", having a perfectly circular configuration, with inner channels 10 and seats 20 facing inwardly.

From the above disclosure it should be apparent that the invention fully achieves the intended aim and objects.

In particular, the fact is to be pointed out that a brush has been provided allowing to always hold the bristles thereof in a perfectly lubricated and cleaned condition, by spraying water, a chemical liquid or air, adapted to constantly clean said bristles.

The invention, as disclosed, is susceptible to several modifications and variations, all of which will come within the scope of the inventive idea.

Moreover, all of the constructional details can be replaced by other technically equivalent elements.

In practicing the invention, the used materials, as well as the contingent size and shapes, can be any, depending on requirements.

What is claimed is:

1. A car washing brush including means for lubricating and cleaning the bristles thereof, comprising an extruded tubular body supporting a plurality of variously distributed brush bristles and which can be coupled to a motor-reducing unit for rotatively driving said tubular body, said brush comprising, associated with said tubular body, a plurality of channels for conveying a fluid therethrough, said channels including a corresponding plurality of nozzles for spraying a fluid on said bristles, from the inside toward the outside of the brush, wherein said channels are made integral with said extruded tubular body of said brush.

2. A car washing brush, according to claim 1, wherein said channels are arranged on the inner surface of said extruded tubular body.

3. A car washing brush, according to claim 1, wherein said channels are arranged on the outer surface of said extruded tubular body.

4. A car washing brush, according to claim 1, wherein said tubular body alternately defines a plurality of integrally extruded conveying channels and seats for fixing said extruded tubular body to a flange coupled to said motor-reducing unit.

5. A car washing brush, according to claim 1, wherein said brush comprises a rotary coupling for coupling said brush to an inner pipe for conveying water and a corresponding outer pipe for conveying a foaming material.

6. A car washing brush, according to claim 1, wherein said extruded tubular body has a square cross-section with a plurality of alternately arranged channels and flange fixing recesses integrally extruded inside said tubular body.

7. A car washing brush, according to claim 1, wherein said extruded tubular body comprises a plurality of recessed portions on an outer surface thereof and defines in its inside a plurality of integrally extruded alternately circumferentially arranged inward facing channels and flange recesses.

8. A car washing brush, according to claim 1, wherein said extruded tubular body has a circular cross-section with a plurality of integrally extruded inward facing channels and flange recesses.

* * * * *